(12) United States Patent
Ishii et al.

(10) Patent No.: US 10,381,909 B2
(45) Date of Patent: Aug. 13, 2019

(54) LINEAR VIBRATION MOTOR

(71) Applicant: Nidec Copal Corporation, Tokyo (JP)

(72) Inventors: Shiwori Ishii, Tokyo (JP); Masaji Yoshimura, Tokyo (JP); Toshiyuki Aoki, Tokyo (JP); Yoshinori Katada, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 136 days.

(21) Appl. No.: 15/494,757

(22) Filed: Apr. 24, 2017

(65) Prior Publication Data
US 2017/0317568 A1 Nov. 2, 2017

(30) Foreign Application Priority Data

Apr. 28, 2016 (JP) ................ 2016-091488

(51) Int. Cl.
*H02K 1/02* (2006.01)
*H02K 33/02* (2006.01)
*B06B 1/02* (2006.01)

(52) U.S. Cl.
CPC ............ *H02K 33/02* (2013.01); *B06B 1/02* (2013.01)

(58) Field of Classification Search
CPC ........ H02K 33/02; H02K 33/12; H02K 33/00; H02K 33/16; B06B 1/02; B06B 1/04
See application file for complete search history.

(56) References Cited

U.S. PATENT DOCUMENTS

| 2007/0040457 A1* | 2/2007 | Shimizu | A61C 17/3445 |
| | | | 310/15 |
| 2010/0027092 A1* | 2/2010 | van Os | G02B 7/181 |
| | | | 359/223.1 |
| 2013/0169071 A1* | 7/2013 | Endo | H02K 33/02 |
| | | | 310/25 |

FOREIGN PATENT DOCUMENTS

| JP | 2015047003 A | * | 3/2015 | ......... B60C 23/0493 |
| JP | 2016-13554 A | | 1/2016 | |

OTHER PUBLICATIONS

JP 2015047003 A machine translation Sep. 28, 2018.*

* cited by examiner

*Primary Examiner* — Julio C. Gonzalez
*Assistant Examiner* — Leda T Pham
(74) *Attorney, Agent, or Firm* — Troutman Sanders LLP

(57) ABSTRACT

Disclosed is a linear vibration motor comprising a movable element that is equipped with a magnet and weights; a coil for applying a driving force on the magnet through the application of an electric current; a frame, wherein the coil is secured; a shaft, borne on or secured by the frame, for supporting the movable element so as to be able to vibrate along the axial direction; and coil springs, disposed between the movable element and the frame, for elastically supporting the vibration of the movable element along the axial direction, on both sides of the movable element in the direction of vibration, wherein the directions of winding of the coil springs are set so as to prevent rotational vibration, around the shaft, of the movable element that is vibrating reciprocatingly along the axial direction.

5 Claims, 10 Drawing Sheets

LINEAR VIBRATION MOTOR

CROSS REFERENCE TO RELATED APPLICATION

This application is based upon and claims the benefit of priority of the prior Japanese Patent Application No. 2016-091488, filed on Apr. 28, 2016, the entire contents of which are incorporated herein by reference.

FIELD OF TECHNOLOGY

The present invention relates to a linear vibration motor.

BACKGROUND

Vibration motors (or "vibration actuators") are built into mobile electronic devices, and are broadly used as devices to communicate to the user, through a vibration, that there is an incoming call, or that a signal, such as an alarm, has been generated, and have become indispensable devices in wearable devices, which are carried on the body of the user. Moreover, in recent years vibration motors have been of interest as devices by which to achieve haptics (skin-sensed feedback) in the human interfaces such as touch panels.

Among the various forms of vibration motors that are under development, there is interest in linear vibration motors that are able to generate relatively large vibrations through linear reciprocating vibrations of a movable element. A conventional linear motor is provided with a weight and a magnet on a movable element side, where an electric current is applied to a coil that is provided on the stator side to cause the Lorentz forces that act on the magnet to form a driving force, to cause the movable element, which is elastically supported along the direction of vibration, to undergo reciprocating vibrations in the axial direction. There is a known conventional linear vibration motor of this type, wherein a shaft is disposed along the direction of vibration, and coil springs are disposed on both sides, in the direction of vibration, of the movable element, to cause the movable element to vibrate while the guided by the shaft (See, for example, Japanese Unexamined Patent Application Publication No. 2016-13554).

SUMMARY

In the conventional linear vibration motor, described above, the movable element is vibrated while being guided by the shaft, to produce a stabilized linear travel performance for the reciprocating vibration, and there is the benefit of resistance to damage, even when there is a dropping impact, due to the shaft holding the movable element. However, the movable element is formed in a circular column shape, and because the shaft passes therethrough along the axis, the ability to reduce the thickness of the linear vibration motor is limited structurally. In this regard, as mobile electronic devices are made smaller and thinner, there are demands for the vibration motors equipped therein to also be made smaller and thinner, and in particular, in electronic devices that are provided with flat-panel display portions, such as smartphones, the space within the device in the direction of thickness, which is perpendicular to the display panel, is limited, and thus there is a strong need for the vibration motor, which is equipped therein, to be thinner.

As a structure for a linear vibration motor able to respond to such requests for reduced thickness, the use of a thin shape (for example, a shape with a rectangular cross section) for the movable element has been considered. However, with a movable element with such a thin shape, when the movable element undergoes rotational vibration when vibrating along a shaft, the side portions of the movable element that are away from the shaft tend to collide repeatedly with the frame, or the like, that surrounds the movable element, which tends to produce noise.

Handling of such a situation is the problem to be solved by the present invention. That is, the problems to be solved by the present invention are to enable a linear vibration motor to be made thinner, to prevent the production of noise through preventing rotational vibration of the movable element around the shaft when vibrating a movable element along a shaft, and the like.

In order to solve such a problem, the linear vibration motor according to the present invention is provided with the following structures:

A linear vibration motor comprising: a movable element equipped with a magnet and a weight; a coil for applying a driving force to the magnet, through the application of an electric current; a frame to which the coil is secured; a shaft that is borne or secured on the frame, and that supports the movable element so as to enable vibration along an axial direction; and coil springs, disposed between the movable element and the frame, for supporting elastically vibration of the movable element along the axial direction, on both sides of the movable element in the direction of vibration, wherein: winding directions of the coil springs are set so as to prevent rotational vibration, around the shaft, of the movable element that vibrates reciprocating along the axial direction.

BRIEF DESCRIPTIONS OF THE DRAWINGS

DETAILED DESCRIPTION

Figure 1:
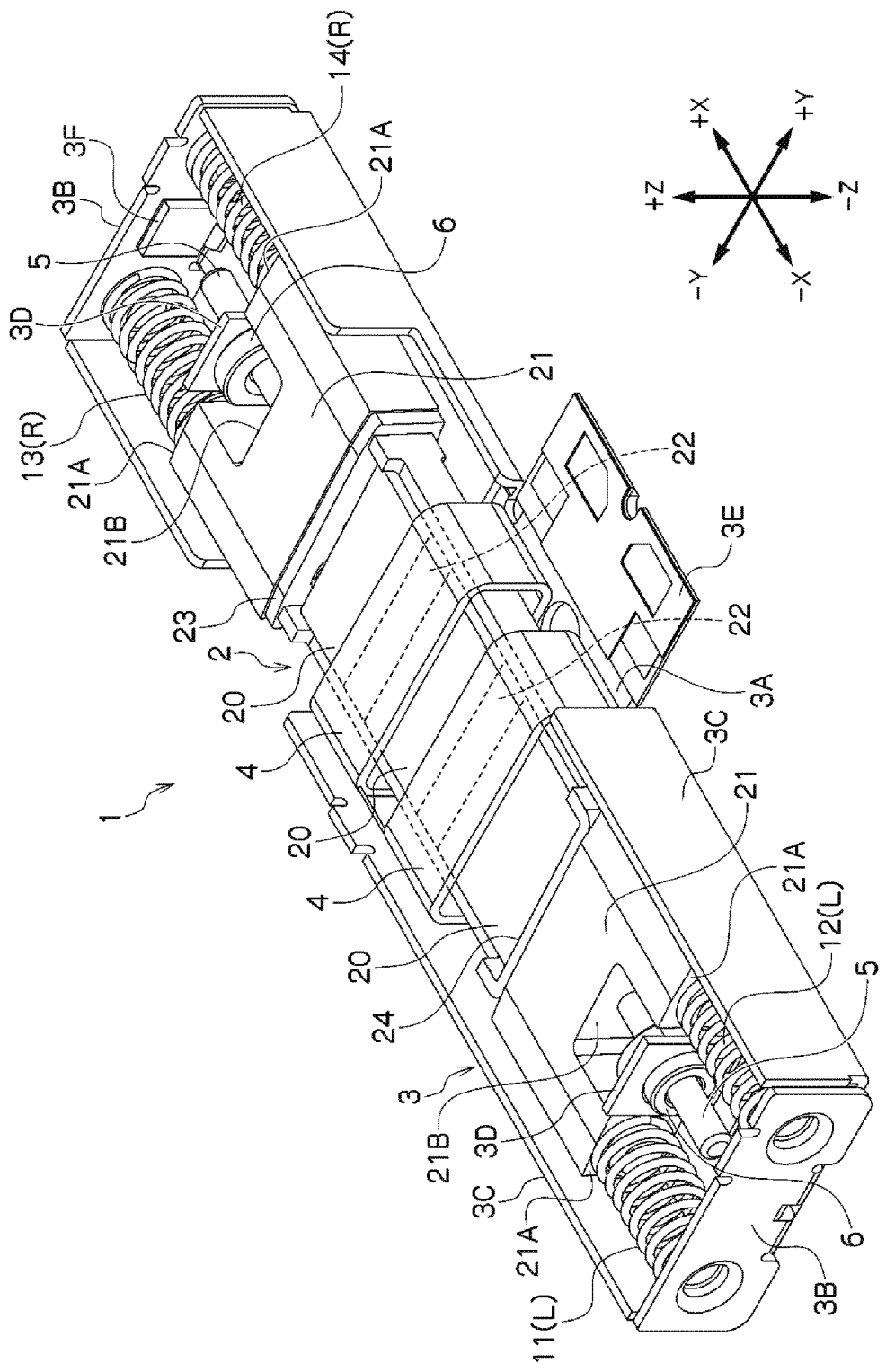
FIG. 1 is a perspective diagram illustrating the internal structure of a linear vibration motor according to an example according to the present invention.

An example according to the present invention will be explained below in reference to the drawings. In the explanation below, identical reference symbols in different drawings indicate identical positions, and redundant explanations will be omitted as appropriate. In each of the drawings, the ±X directions of the arrows indicate the directions in which the movable element vibrates (the axial direction), where ±Y directions of the arrows indicate the width directions that are perpendicular to the direction of vibration of the movable element. Moreover, the ±Z directions of the arrows indicate the thickness directions of the movable element.

A linear vibration motor 1 according to an example according to the present invention, as illustrated in FIG. 1 through FIG. 8, comprises: a movable element 2 that is equipped with a magnet 20 and weights 21; a coil 4 for applying a driving force on the magnet 20 through the application of an electric current; a frame 3, wherein the coil 4 is secured; a shaft 5, borne on or secured by the frame 3, for supporting the movable element 2 so as to be able to vibrate along the axial direction; and coil springs 11, 12, 13, and 14, disposed between the movable element 2 and the frame 3, for elastically supporting the vibration of the movable element 2 along the axial direction, on both sides of the movable element 2 in the direction of vibration.

In such a linear vibration motor 1, when the movable element 2 vibrates reciprocatingly along the shaft 5, there is a tendency to produce noise as the movable element 2 vibrates rotationally around the shaft 5, through repeated collisions of the side portions of the movable element 2, which are away from the center of the shaft 5, against, for example, the bottom frame 3A of the frame 3, when using a movable element 2 that has a thin cross-sectional shape wherein the dimension in the width direction (the ±Y directions in the figures) is large when compared to the dimensions in the thickness direction (the ±Z directions in the figure) (that is, having a rectangular cross-sectional shape).

Based on new knowledge that, in the linear vibration motor 1 in the example according to the present invention, one cause of such rotational vibration of the movable element 2 around the shaft 5 is the applied pressure (rotational force) that derives from the directions of winding of the coil springs 11 through 14, the winding directions of the coil springs 11 through 14 are set so as to prevent rotational vibration, around the shaft 5, of the movable element 2 that vibrates reciprocatingly along the shaft 5 (in the axial direction). While the present invention will be explained in detail below referencing the examples in the drawings, the present invention is not limited thereto.

The overall structure that is common to the examples illustrated in FIG. 1 through FIG. 8 will be explained first. In a magnet 20 that is provided in the movable element 2, driving forces in the ±X direction are applied through the application of an electric current to a coil 4. In the example in the figure, three magnets 20 that are magnetized along the ±X directions are disposed so that identical poles are mutually adjacent, where spacers 22 are disposed between the identical poles of the magnets 20.

The coil 4 that is secured to the frame 3 is wound around the periphery of the spacer 22. Through this, the Lorentz forces that are produced when an electric current is applied to the coil 4 serve as the driving forces to vibrate the movable element 2 in the ±X direction. The movable element 2 can be vibrated effectively through inputting, into the coil 4, pulses or an AC current at the resonant frequency that is determined by the weight of the movable element 2 and the spring constants of the coil springs 11 through 14.

The movable element 2 is equipped with weights 21, so as to increase the weight thereof. A material with a high specific gravity, such as tungsten, or the like, is used for the weights 21. In the example in the figure, weights 21 are attached to both sides, in the direction of vibration, of the magnets 20. The magnet 20 and the spacers 22 are reinforced together as a single unit through a connecting reinforcing frame 24, where the connecting reinforcing frame 24 is connected to one of the weights 21, with a connecting frame 23 that is connected to one end portion of the connecting reinforcing frame 24 are connected to the other weight 21. The magnets 20, the spacers 22, and the weights 21 are connected together thereby, to form a highly rigid movable element 2.

The shaft 5 that is arranged along the ±X directions in the figure is secured within recessed portions 21B that are provided to the outsides of the weights 21 in the direction of vibration. In the example in the figure, the shaft 5 is secured on the movable element 2 side, and is borne by a bearing 6 that is attached to a bearing supporting frame 3D of the frame 3. The recessed portion 21B of the weight 21 is provided with a width that is able to contain the bearing supporting frame 3D, thereby ensuring an adequate vibrational amplitude for the movable element 2. The shaft 5 is not limited to this example, but rather may instead be secured on the frame 3 side, with the bearing provided on the movable element 2 side, or both ends of the shaft 5 may be secured to the frame 3, passing through the movable element 2.

The frame 3 is provided with a bottom frame 3A to which the coil 4 is secured, and also provided with a pair of spring supporting frames 3B that face each other in the ±X direction and a pair of side frames 3C that face each other in the ±Y direction. An input terminal portion 3E, to which the terminal portion of the coil 4 is connected, is provided extending from the bottom frame 3A. Although not shown, a cover frame that faces the bottom frame 3A may be provided contacting the top edges of the spring supporting frames 3B and of the side frames 3C.

Spring supporting ends 21A are provided on the end portions of the weights 21 in the movable element 2, where coil springs (compression coil springs) 11, 12, 13, and 14 are arranged between the spring supporting ends 21A and the spring supporting frames 3B of the frame 3. Moreover, shock absorbing members 3F for absorbing the shocks of the collisions of the end portions of the shaft 5 are provided on the inner surface sides of the spring supporting frames 3B.

An example of a linear vibration motor 1 that is equipped with such an overall structure will be explained using FIG. 1 through FIG. 4. In the explanations below, the winding directions of the coil springs 11 through 14 are indicated as "R" and "L." Here "R" indicates that, when viewed from the movable element 2 side, the direction of winding, toward the direction in which the coil spring is compressed, is toward the right ("right-winding"), and "L" indicates that, when viewed from the movable element 2 side, the direction of winding, toward the direction in which the coil spring is compressed, is toward the left ("left-winding").

In the example, the winding directions of the coil springs 11 through 14 are set so that the movable element 2 that vibrates reciprocatingly along the shaft 5 (in the axial direction) is rotationally biased in one direction around the shaft 5. While, in the example in the figure, an example is shown wherein four coil springs are provided, in at least one coil spring should be provided on each of the movable element 2 in the direction of vibration thereof.

The coil springs 11 through 14 produce pressure that is applied along the directions of winding of the coil springs 11 through 14 when compressed, but here, this applied pressure is used to intentionally rotate the movable element 2 around the shaft 5, to produce a vibration in a state wherein one side is against the frame 3, to prevent the production of noise through preventing rotational vibration. In this example, the location of contact of the movable element 2 in the frame 3 is a smooth surface, enabling smooth vibration that does not produce contact noise.

Figure 2:
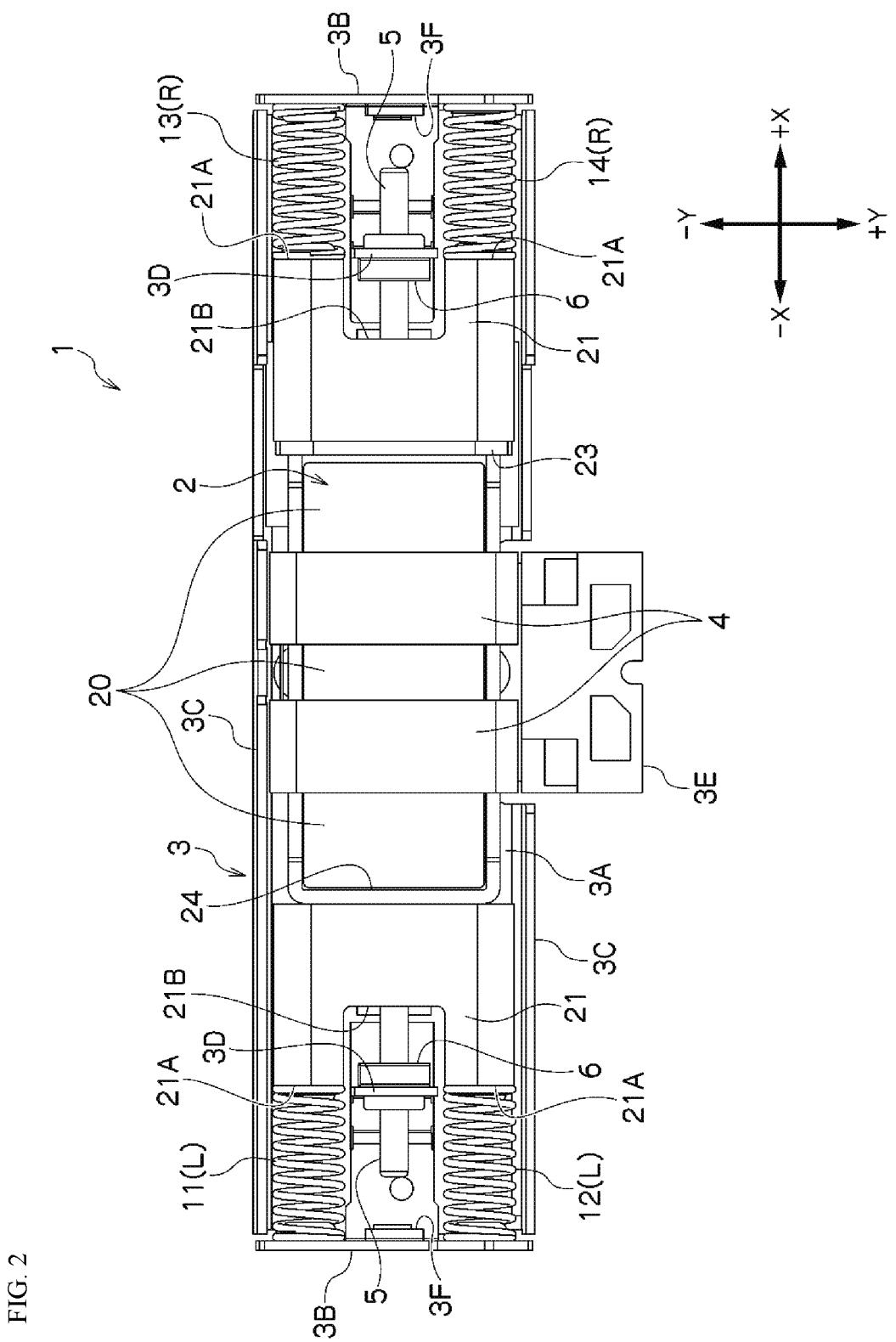
FIG. 2 is a plan view illustrating the internal structure of a linear vibration motor according to the example of the present invention.
Figure 3:
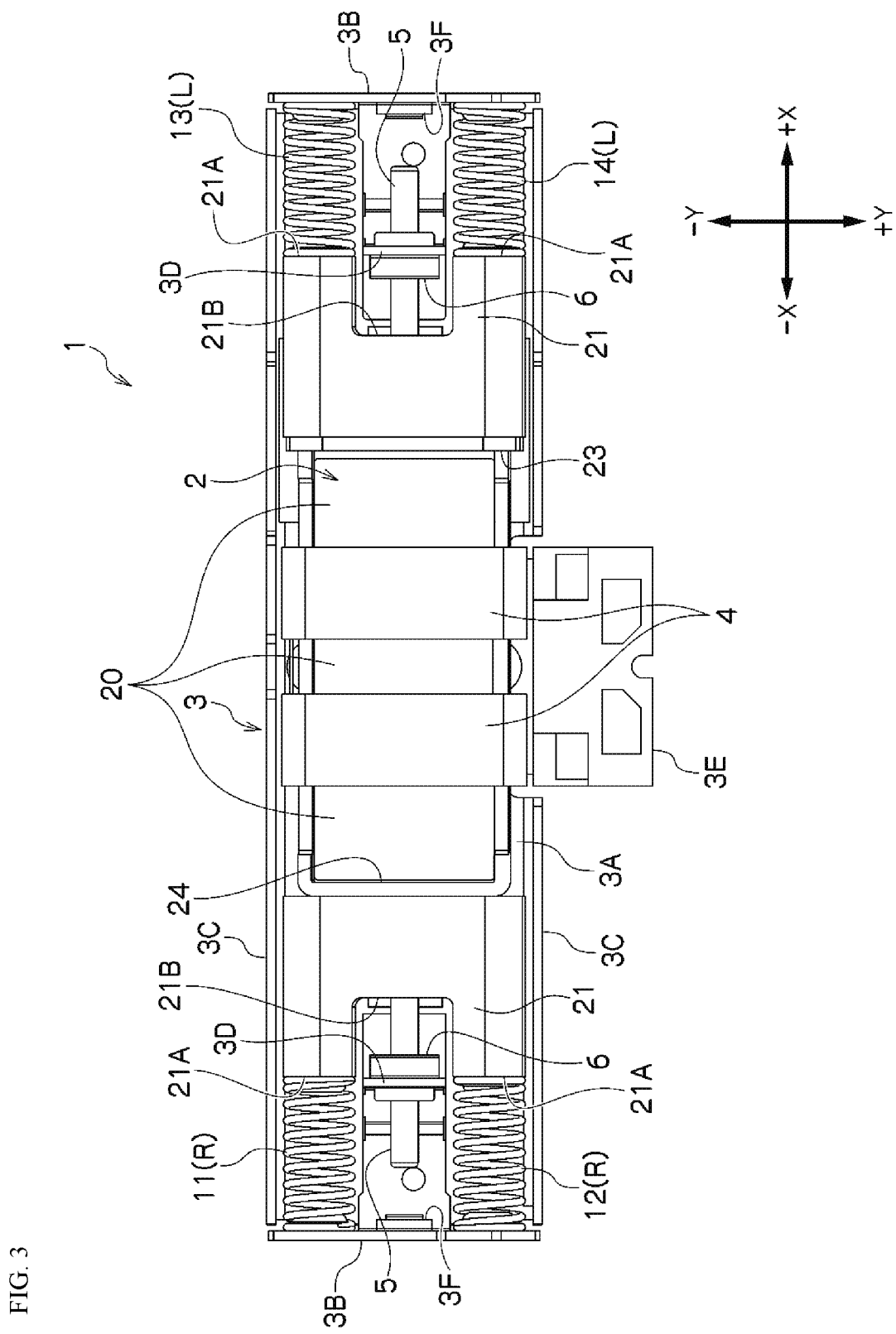
FIG. 3 is a plan view illustrating the internal structure of a linear vibration motor according to the example of the present invention.

In the example illustrated in FIG. 1 and FIG. 2, the coil spring 11 and the coil spring 12, which are on one side of the movable element 2 in the direction of vibration, are both left-winding (L), and the coil spring 13 and coil spring 14, which are on the other side of the movable element 2 in the direction of vibration, are both right-winding (R). Moreover, in the example illustrated in FIG. 3, the coil spring 11 and the coil spring 12, which are on one side of the movable element 2 in the direction of vibration, are both right-winding (R), and the coil spring 13 and coil spring 14, which are on the other side of the movable element 2 in the direction of vibration, are both left-winding (L).

Given such an example, the coil springs (11 and 12) that are disposed on one side of the movable element 2 along the shaft 5, and the coil springs (13 and 14) that are disposed on the other side of the movable element 2 along the shaft 5, have the winding directions of the coil springs wound in mutually opposing directions, when viewed from the movable element 2 side. Through this, the rotational force received when the coil springs (11 and 12) on one side of the movable element 2, in the direction of vibration, are compressed, and the rotational force received when the coil springs (13 and 14) on the other side of the movable element 2, in the direction of vibration, are compressed, will be in the same direction, so that no rotational vibration will be produced when the movable element 2 vibrates reciprocatingly, enabling a vibration that is always in a state that is rotationally biased in one direction.

Figure 4:
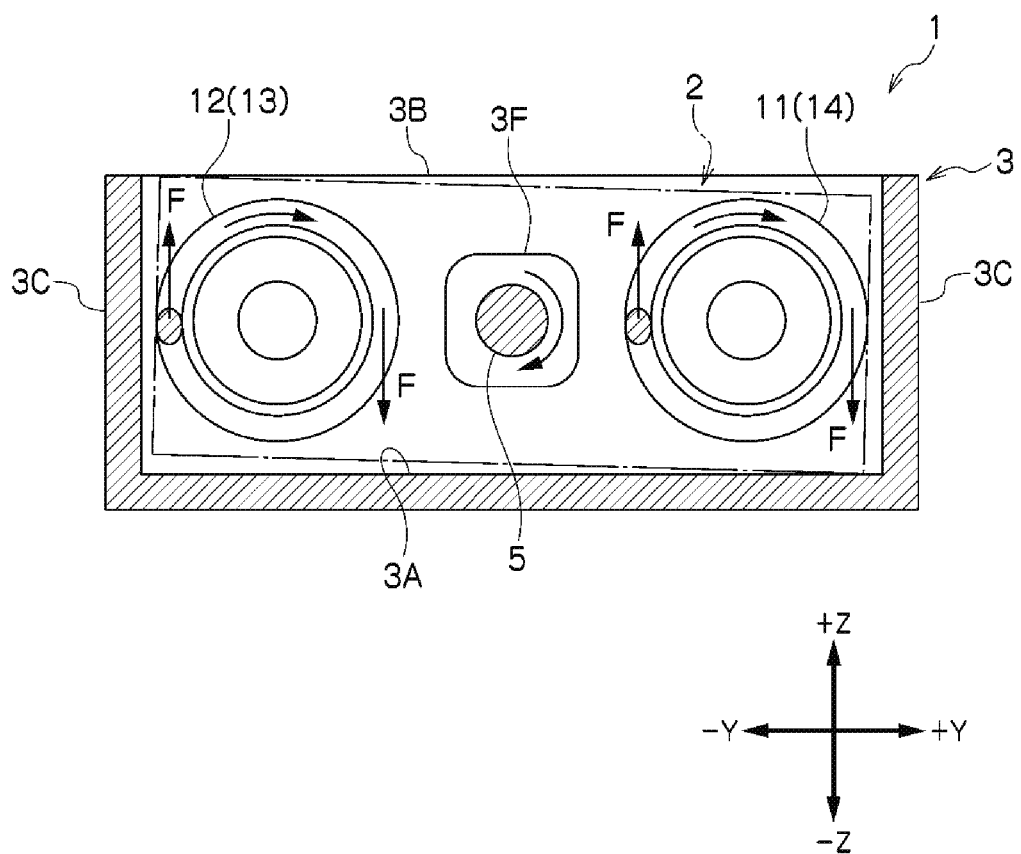
FIG. 4 is a cross-sectional diagram illustrating the direction of winding of a coil spring in a linear vibration motor according to to the example of the present invention.
Figure 5:
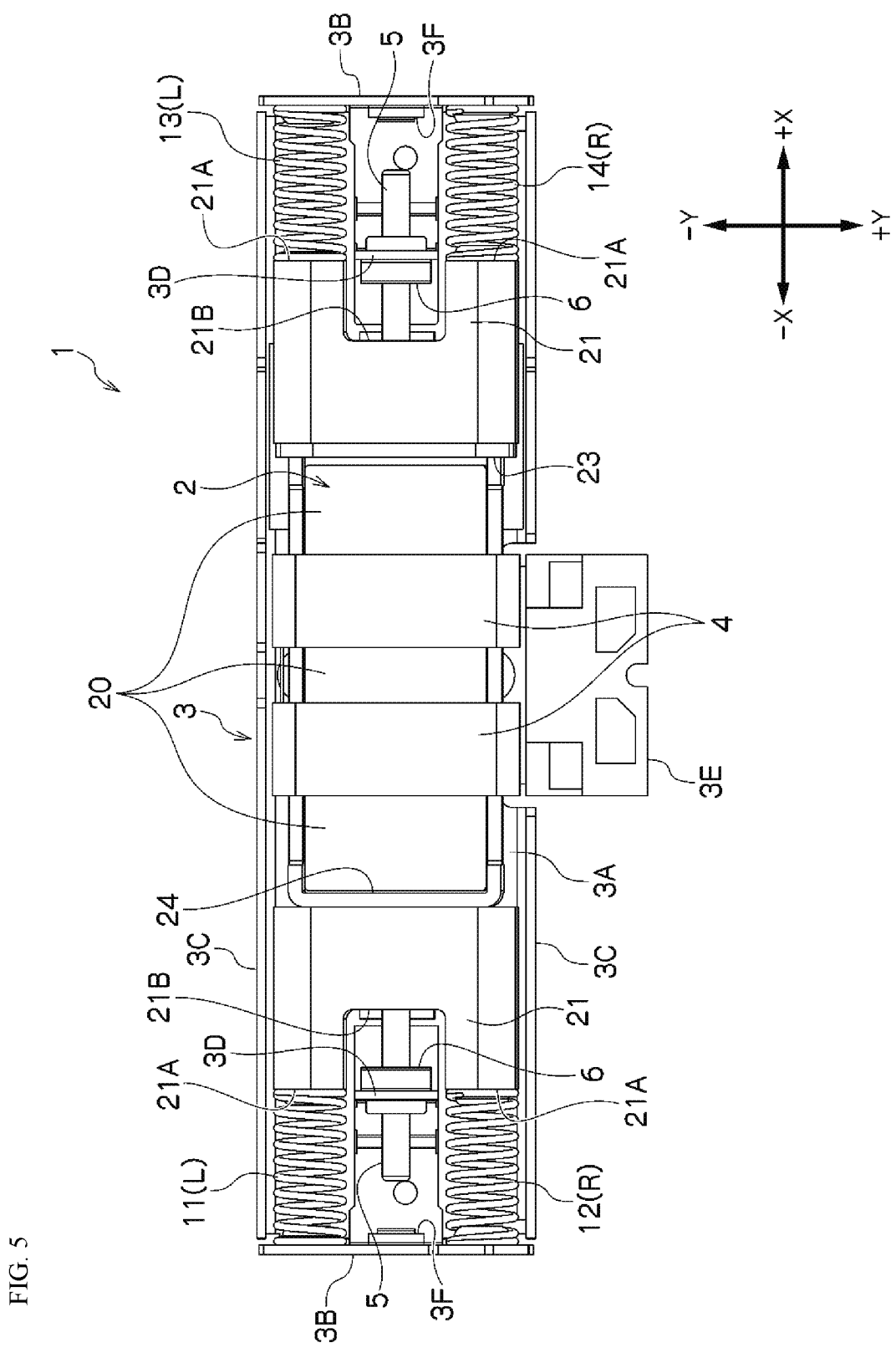
FIG. 5 is a plan view illustrating the internal structure of a linear vibration motor according to another example of the present invention.

FIG. 4 is a cross-sectional diagram wherein the coil spring is viewed from the movable element side, illustrating the operating principle in the example. When the coil spring 11 (14) and the coil spring 12 (13) are compressed by the vibration of the movable element 2, a rotational force F that rotates to the right is produced in the right-winding (R) coil spring, as illustrated by the arrow in the figure, where the moment of the force on the movable element 2 that is borne by the shaft 5, caused by this rotational force F, will be larger in accordance with the distance from the shaft 5. Through this, the moment of the force that controls the direction of the rotational force F, which acts that a long distance from the shaft 5, will be applied to the movable element 2, and in the state that is illustrated, the movable element 2 will be rotationally biased to rotate toward the right, relative to the shaft 5.

As illustrated in FIG. 4, when a plurality of coil springs 11 and 12 (or 13 and 14) is disposed between the movable element 2 and the frame 3, having the winding directions of these coil springs 11 and 12 (or 13 and 14) be in identical directions effectively enables a rotational bias, around the shaft 5, to be applied to the movable element 2. Rotational vibration of the movable element 2 around the shaft 5 can be prevented through setting the winding directions of the coil springs, on both sides of the movable element 2, in the direction of vibration, so that the rotational biasing that is applied thereto will not switch during reciprocating vibration of the movable element 2.

FIG. 5 through FIG. 8 illustrate another example of a linear vibration motor 1. In this example, the winding directions of the coil springs 11 through 14 are set so that the rotational forces that are applied to the movable element 2 through compression of the coil springs 11 through 14 will cancel each other out. Through this, rotational vibration of the movable element 2 is prevented through balancing of the rotational forces of the plurality of coil springs 11 and 12 (or 13 and 14) that are arranged between the movable element 2 and the frame 3.

Specifically, as illustrated in FIG. 5 through FIG. 8, in the pair of coil springs 11 and 12 (or 13 and 14) that are disposed on the left and the right of the shaft 5, the winding directions are set to mutually opposite directions, when viewed from the movable element 2 side. That is, in the example illustrated in FIG. 5, in the coil springs 11 and 12 that are compressed simultaneously by the movement of the movable element 2 toward one side, the coil spring 11 is left-winding (L), and the coil spring 12 is set to be right-winding (R). Moreover, in the coil springs 13 and 14 that are compressed simultaneously by the movement of the movable element 2 toward the other side, the coil spring 13 is left-winding (L), and the coil spring 14 is set to be right-winding (R).

Figure 6:
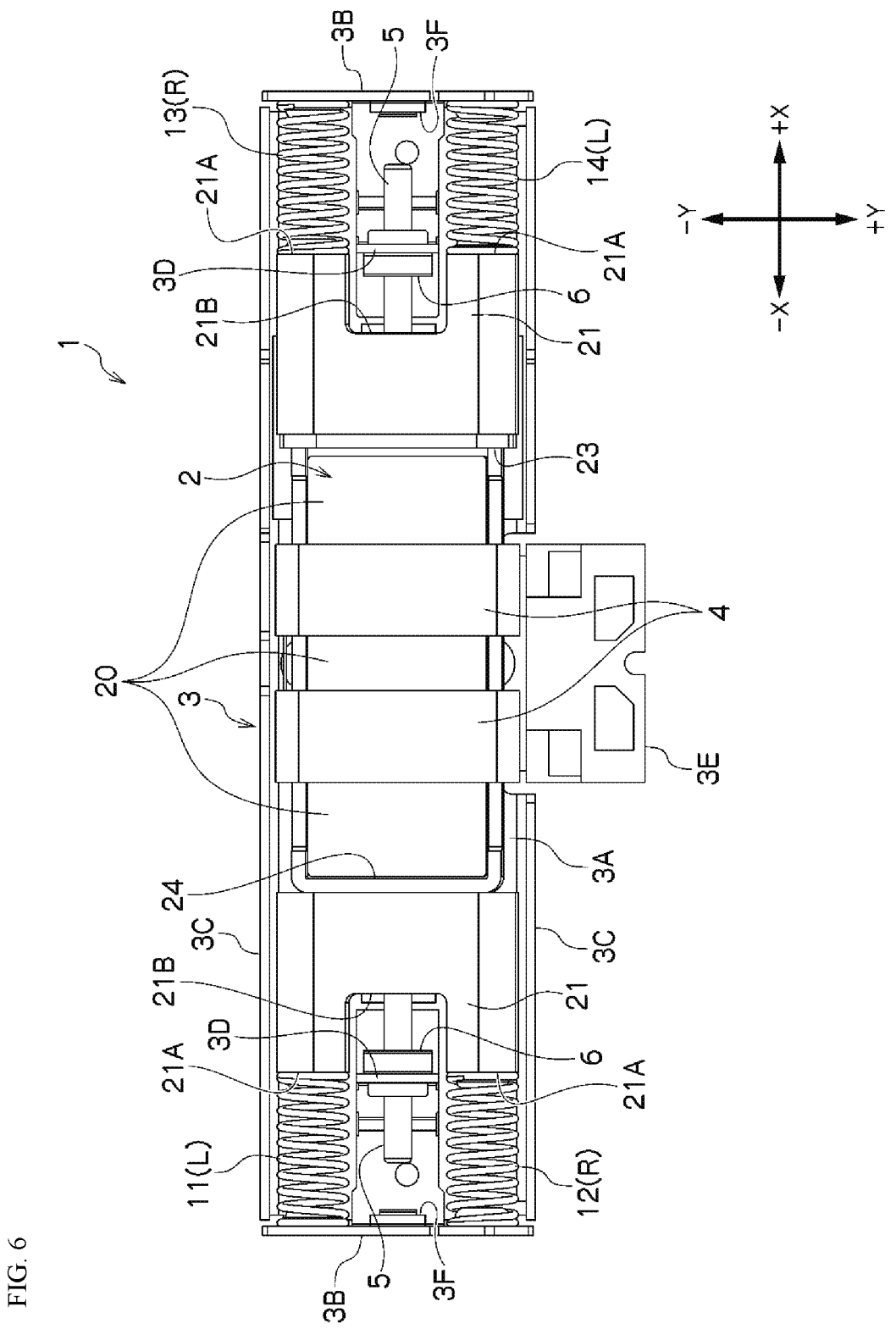
FIG. 6 is a plan view illustrating the internal structure of a linear vibration motor according to the other example of the present invention.

In the example illustrated in FIG. 6, in the coil springs 11 and 12 that are compressed simultaneously by the movement of the movable element 2 toward one side, the coil spring 11 is left-winding (L), and the coil spring 12 is set to be right-winding (R), and in the coil springs 13 and 14 that are compressed simultaneously by the movement of the movable element 2 toward the other side, the coil spring 13 is right-winding (R), and the coil spring 14 is set to be left-winding (L).

Figure 7:
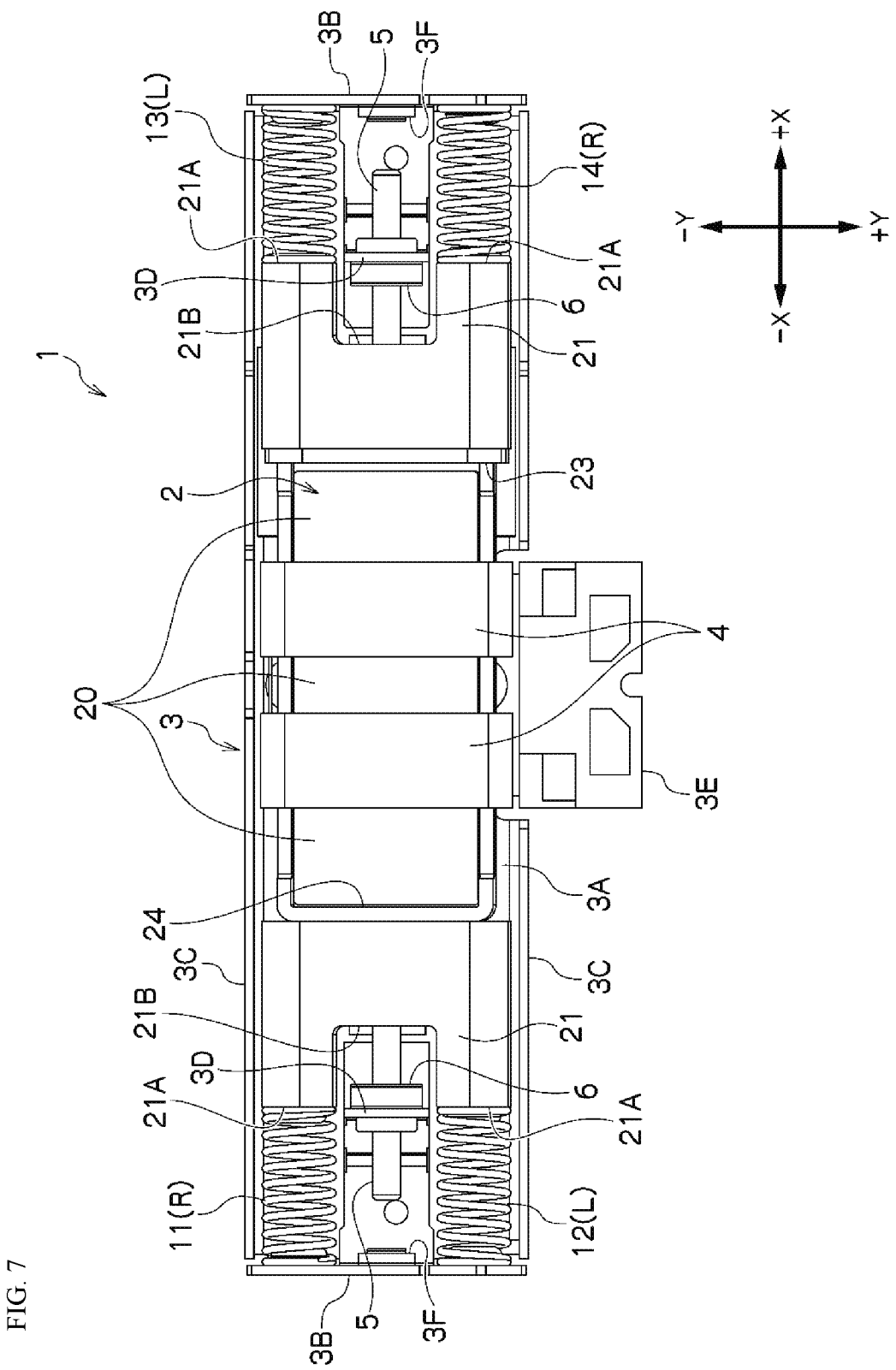
FIG. 7 is a plan view illustrating the internal structure of a linear vibration motor according to to the other example of the present invention.

In the example illustrated in FIG. 7, in the coil springs 11 and 12 that are compressed simultaneously by the movement of the movable element 2 toward one side, the coil spring 11 is right-winding (R), and the coil spring 12 is set to be left-winding (L), and in the coil springs 13 and 14 that are compressed simultaneously by the movement of the movable element 2 toward the other side, the coil spring 13 is left-winding (L), and the coil spring 14 is set to be right-winding (R).

Figure 8:
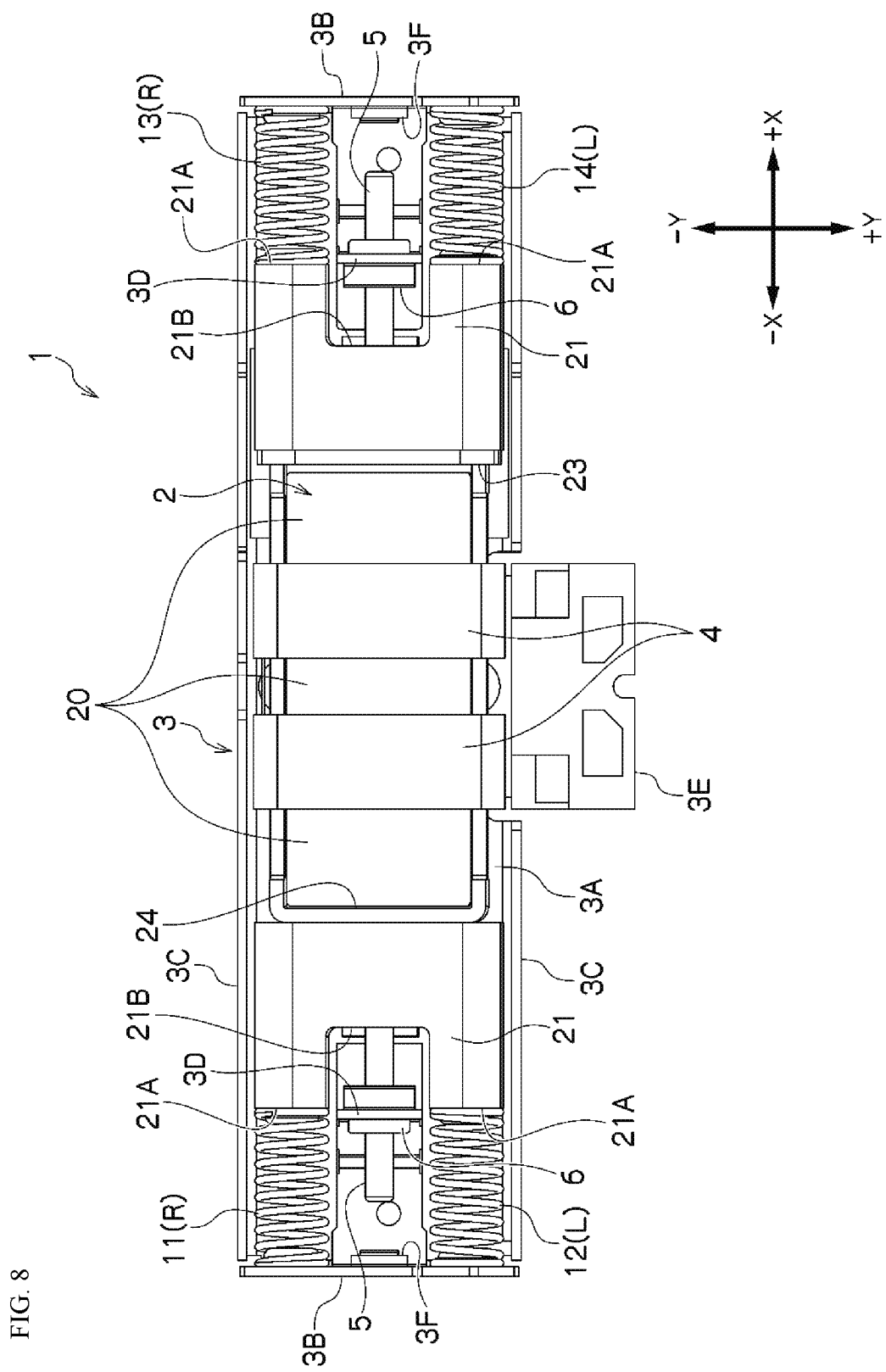
FIG. 8 is a plan view illustrating the internal structure of a linear vibration motor according to to the other example of the present invention.

In the example illustrated in FIG. 8, in the coil springs 11 and 12 that are compressed simultaneously by the movement of the movable element 2 toward one side, the coil spring 11 is right-winding (R), and the coil spring 12 is set to be left-winding (L), and in the coil springs 13 and 14 that are compressed simultaneously by the movement of the movable element 2 toward the other side, the coil spring 13 is right-winding (R), and the coil spring 14 is set to be left-winding (L).

Figure 9:
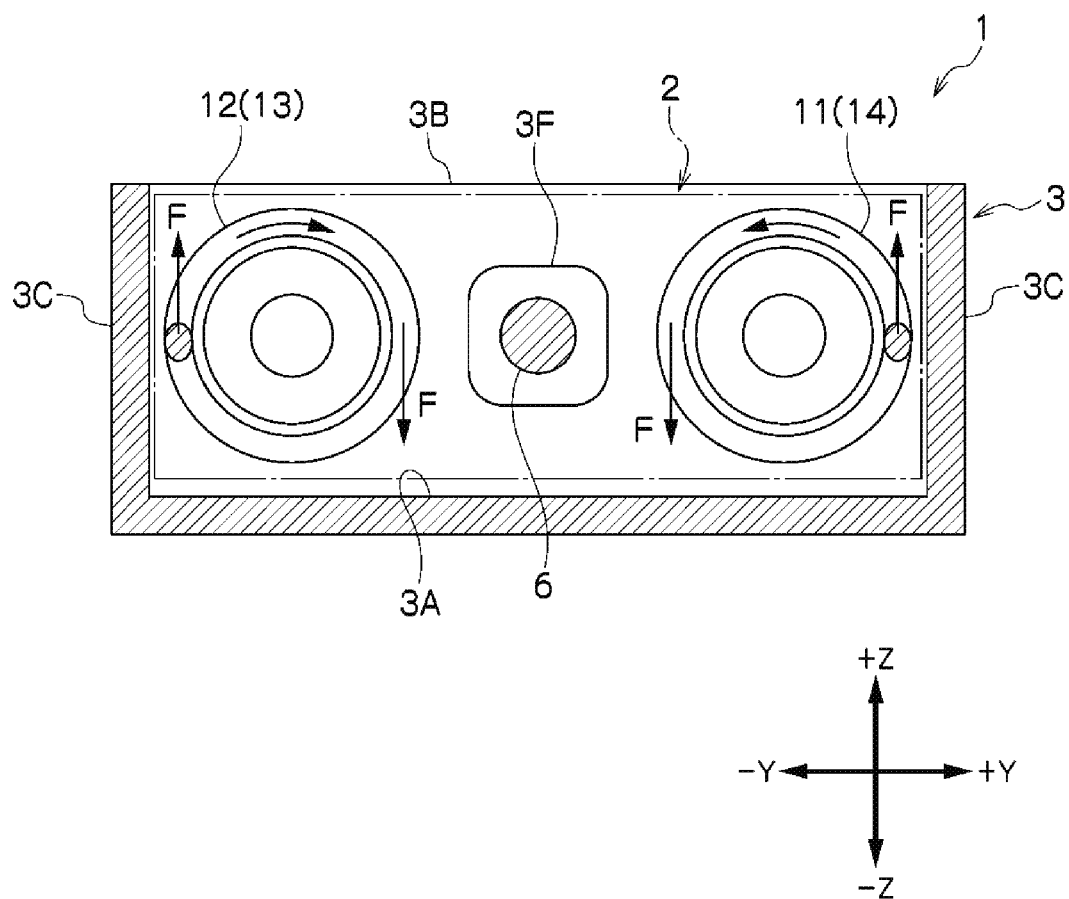
FIG. 9 is a cross-sectional diagram illustrating the direction of winding of a coil spring in a linear vibration motor according to to the other example of the present invention.

FIG. 9 is a cross-sectional diagram wherein the coil spring is viewed from the movable element side, illustrating the operating principle in this example. When the coil spring 11 (14) and the coil spring 12 (13) are compressed simultaneously by the vibration of the movable element 2, a rotational force F that rotates to the right is produced in the right-winding (R) coil spring, as illustrated by the arrow in the figure, where the moment of the force on the movable element 2 that is borne by the shaft 5, caused by this rotational force F, will be larger in accordance with the distance from the shaft 5. Through this, the moment of the force that controls the direction of the rotational force F, which acts that a long distance from the shaft 5, will be applied to the movable element 2, but, as is shown in the figure, the rotational forces F of the coil spring 11 (14) and the coil spring 12 (13) in relation to the shaft 5 will act equally in opposite directions, making it possible to maintain the movable element 2 in a state of balance wherein the rotational forces cancel each other out.

As explained above, in the linear vibration motor 1 according to the example according to the present invention, the winding directions of the coil springs 11 through 14 are set so as to prevent rotational vibration, around the shaft 5, of the movable element 2 that vibrates reciprocatingly along the shaft 5 (the axial direction). This makes it possible to eliminate the problem of noise being produced through rotational vibration of the movable element 2 around the shaft 5, even when the movable element 2 has a thin cross-sectional shape. In this way, the examples of the present invention make it possible to produce a thin linear vibration motor 1 that is highly resistant to dropping damage, and that prevents the production of noise, while producing a stable linear motion vibration along the shaft 5.

Figure 10:
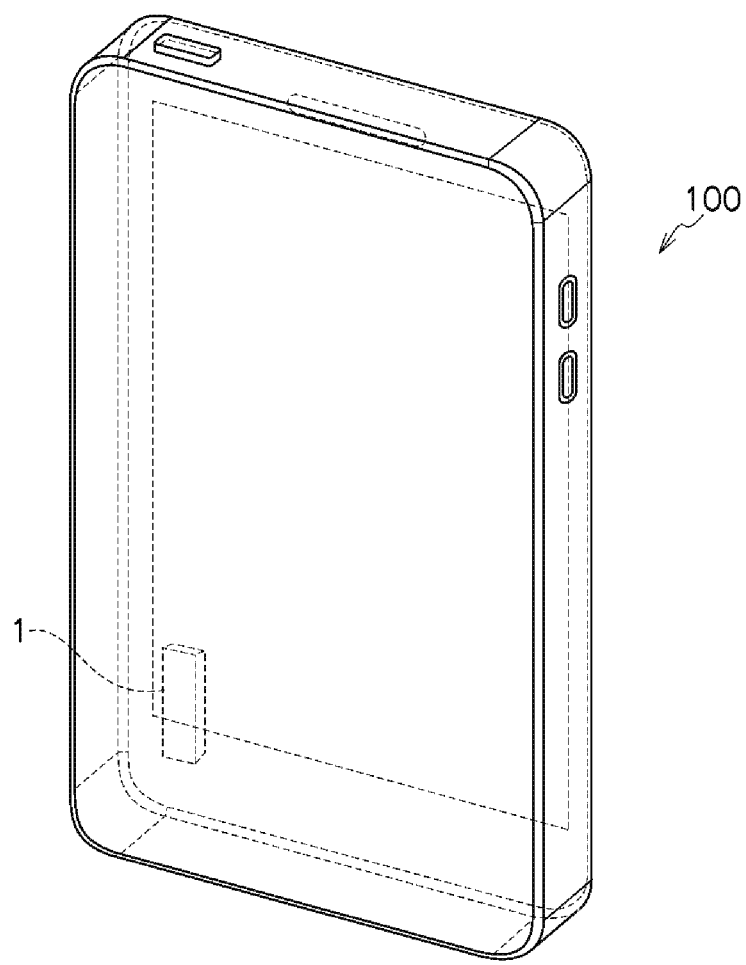
FIG. 10 is a perspective diagram illustrating a mobile electronic device in which is provided a linear vibration motor according to a further example according to the present invention.

FIG. 10 illustrates a mobile information terminal (a mobile electronic device) 100 as one example of an electronic device equipped with a linear vibration motor 1 according to an example according to the present invention. The mobile information terminal 100 that is equipped with the thin and light linear vibration motor 1 that is able to produce a stabilized vibration can communicate to users, through stabilized vibrations that tend not to produce noise, incoming calls in a communication function, or the beginning or end of an operation, such as an alarm function. Moreover, this makes it possible to produce a mobile information terminal 100 that facilitates superior mobility and design quality through making the linear vibration motor 1 thinner and smaller. Furthermore, because the linear vibration motor 1 is of a compact shape wherein the various components are contained within a frame 3 of a rectangular shape wherein the thickness is suppressed, it can be mounted, with excellent space efficiency, within a thinner mobile information terminal 100.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

What is claimed is:

1. A linear vibration motor comprising:
   a movable element equipped with a magnet and a weight;
   a coil applying a driving force to the magnet, through an application of an electric current;
   a frame to which the coil is secured;
   a shaft that is borne or secured on the frame, and that supports the movable element so as to enable vibration along an axial direction; and
   coil springs, disposed between the movable element and the frame, for supporting elastically vibration of the movable element along the axial direction, on both sides of the movable element in the direction of vibration, wherein:
   winding direction of the coil springs is set so that the movable element oscillating reciprocally along the axial direction suppresses rotational vibration around the shaft due to rotational force derived from the winding direction of the coil springs.

2. The linear vibration motor as set forth in claim 1, wherein:
   the coil spring that is disposed on one side of the movable element, along the shaft, and the coil spring that is disposed on the other side of the movable element, along the shaft, are wound with the winding directions of the coil springs being in mutually opposing directions, when viewed from the movable element side.

3. The linear vibration motor as set forth in claim 1, wherein:
   the coil springs that are disposed in a pair on the left and right of the shaft have the winding directions thereof set so as to be in mutually opposite directions, when viewed from the movable element side.

4. The linear vibration motor as set forth in claim 1, wherein:
   the movable element has a cross-sectional shape.

5. The mobile electronic device comprising a linear vibration motor as set forth in claim 1.

* * * * *